United States Patent [19]
Guerrucci

[11] Patent Number: 5,640,771
[45] Date of Patent: Jun. 24, 1997

[54] HEDGE TRIMMER GUARD

[76] Inventor: James V. Guerrucci, 50090 E. Merle La., Wheeling, Ill. 60090

[21] Appl. No.: 567,900

[22] Filed: Dec. 6, 1995

[51] Int. Cl.⁶ ................................. B26B 19/48
[52] U.S. Cl. .................... 30/132; 30/216; 30/233
[58] Field of Search ................ 30/131, 132, 210, 30/216, 228, 286, 287, 289, 233, 295

[56] References Cited

U.S. PATENT DOCUMENTS

| | | | |
|---|---|---|---|
| 2,747,276 | 5/1956 | Yatsko | 30/132 |
| 3,552,013 | 1/1971 | Stone | 30/132 |
| 3,552,015 | 1/1971 | Batson | 30/216 |
| 3,711,946 | 1/1973 | Troutman | 30/132 |
| 3,838,508 | 10/1974 | Turner, Sr. | 30/216 |
| 3,916,521 | 11/1975 | Sekelsky | 30/132 |
| 3,990,145 | 11/1976 | Rubin | 30/132 |
| 4,071,951 | 2/1978 | Burns | 30/132 |

*Primary Examiner*—Hwei-Siu Payer
*Attorney, Agent, or Firm*—Paul H. Gallagher

[57] ABSTRACT

A transparent plate mounted on a sickle bar, adjacent the inner end thereof. The plate is located in register with the handle that is positioned on the sickle bar, to cover the cutting teeth more fully, at the location where it is held.

6 Claims, 1 Drawing Sheet

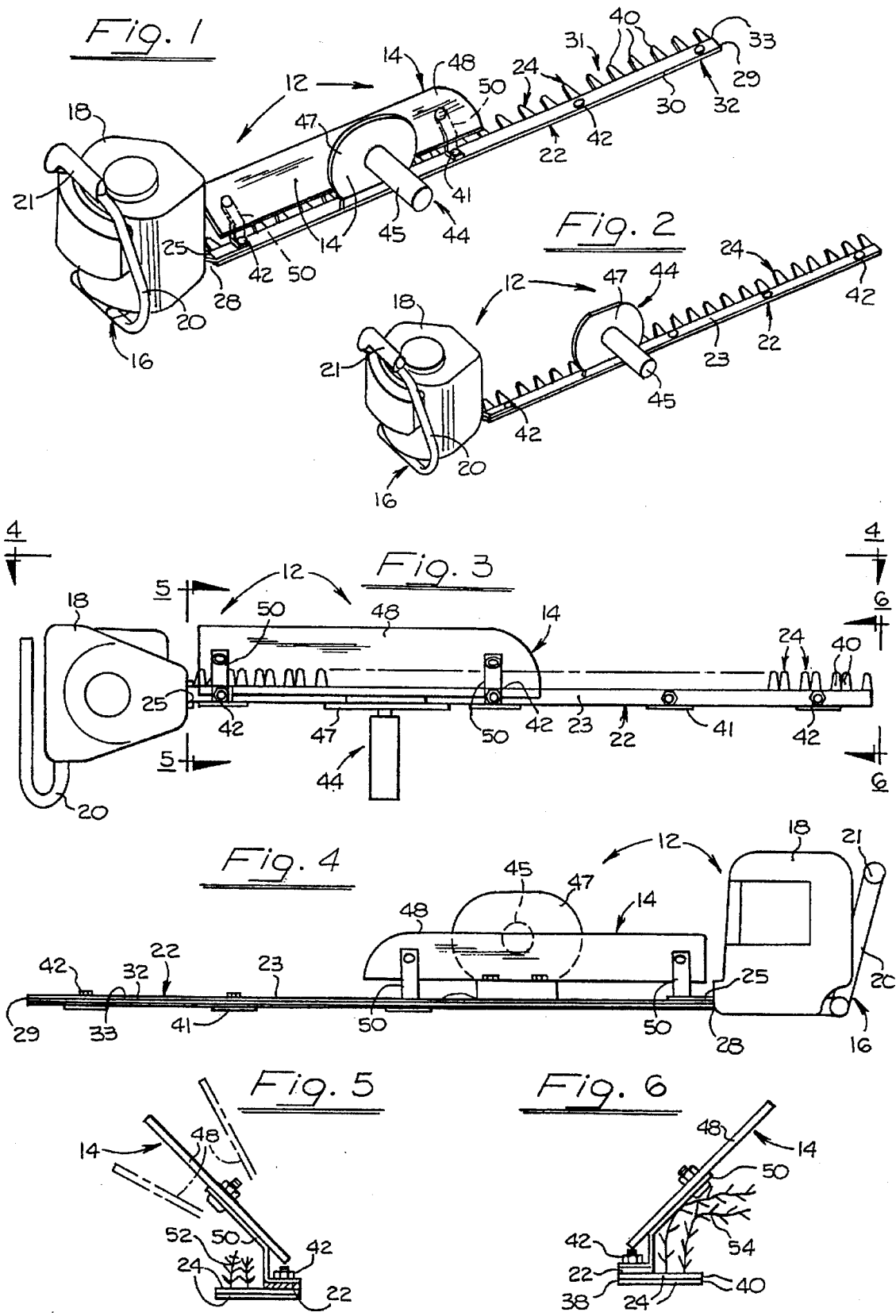

HEDGE TRIMMER GUARD

SUMMARY OF THE INVENTION

The invention resides in the field of hedge trimmers, a very common kind of which includes an elongated sickle, or sickle bar, with a driving engine at one end. The device includes a frame on which the engine and sickle are mounted, the frame also including a fixed element extending along the sickle, and constituting the means on which the cutter blades are directly mounted.

In this kind of hedge trimmer, there is a handle at one end, on the frame adjacent the engine, remote from the sickle bar, and a second handle along the length of the sickle bar. In the use of the device, the first handle is gripped by one hand— the left hand in the case of a right-handed person, and the other handle is gripped by the right hand.

In the use of this kind of device, the user would grip the handle at the end first, and in gripping the second handle by the right hand, his habits would become such that the device would be moved or swung and he would not watch every element of the device in gripping the second handle, and on occasion, unconsciously extend his right hand beyond the second handle and into a danger zone, and sometimes cut his fingers by the cutter elements of the sickle bar.

A main object of the present invention is to overcome the danger referred to above.

A more specific object is to provide a guard or shield on the sickle bar adjacent the position of the usual second handle, to provide greater safety measures in the use of the device.

Another and very important object is to provide such a shield that constitutes an add-on, or after market device which can be easily applied to the sickle bar, essentially without change in the original device.

Still another object is to provide such a shield that is of transparent nature, which accordingly does not interfere with the observation by the user of the hedge being trimmed.

Another object is to provide such a shield that is extremely simple, and correspondingly inexpensive, and it can be produced in any of a variety of guarding positions corresponding with different lengths of clippings which result from the trimming operation.

BRIEF DESCRIPTION OF THE INDIVIDUAL FIGURES OF THE DRAWINGS

FIG. 1 is a perspective view of a hedge trimmer with the guard of the present invention applied thereto.

FIG. 2 is a semi-diagrammatic view, similar to FIG. 1, but on a smaller scale and without the guard of the invention applied thereto.

FIG. 3 is a top view of the device shown in FIG. 1.

FIG. 4 is a font view, at line 4—4 of FIG. 3.

FIG. 5 is a sectional view taken at line 5—5 of FIG. 3.

FIG. 6 is an end view taken at line 6—6 of FIG. 3.

DETAILED DESCRIPTION OF THE INVENTION

Referring in detail to the drawings, FIG. 1 shows a hedge trimmer with the guard of the present invention applied thereto. The hedge trimmer, itself, is indicated at 12, and the guard at 14. The hedge trimmer is of known kind, and is often referred to merely as a sickle, and since it is a known item will not be described in detail, but only to the extent necessary for fully describing the construction and functioning of the safety guard.

The hedge trimmer includes a frame 16 which mounts a driving engine or motor 18 and includes a handle 20 having a transverse hand grip 21. This handle will be referred to herein for convenience as a first handle.

The hedge trimmer also includes a sickle bar 22 which is mounted on the frame 16. The sickle bar includes a frame bar 23 constituting a portion of the frame of the device, and on which cutter blades 24 are reciprocably mounted. A bracket 25 secures the frame bar 23 on the other portion of the frame supporting the engine.

For convenience in referring to the device, the sickle bar has an inner end 28, an outer end 29, a rear edge 30, a front or leading edge 31, an under surface 32, and an upper surface 33.

In further detail description of the sickle bar, attention is directed to FIGS. 3–6. The sickle bar includes the frame bar 23, as noted, which is uppermost and supports the cutter blades. Under the frame bar 23, are the cutter blades 24 (FIG. 3), two in number (FIG. 4), which are substantially identical, each including a backing element 38, and teeth 40. The blades are mounted for longitudinal reciprocation, in mutually opposite directions. The cutter blades 24 are mounted by means of angle brackets 41 which hold the cutter blades, and bolts 42 fitted in holes in the frame bar 23 and the brackets, and in slots in the two cutter blades. These brackets 41 and the corresponding bolts 42 are part of the original device, and are spaced along the sickle bar, and certain ones of the bolts are utilized in mounting the guard 14 of the present device, as described below.

These cutter blades are driven or reciprocated by the engine, by known means (not shown) within the housing containing the engine.

The device or hedge trimmer, as originally provided, includes a second handle 44 which includes a hand grip 45, and a guard 47 in the form of a shield. The hand grip and shield together form a unitary member, which is mounted on the sickle bar, and directly on the fixed frame bar 23. This mounting of the second handle is of known kind. The shield 47 is of predetermined size as to cover the transverse projection of the hand when gripping the hand grip 45.

Brief reference is again made to the danger in grasping the device, explained above. The guard of the present invention is designed to prevent such danger and accidents. The guard 14 includes a plate or panel 48 which is transparent, and made of a suitable plastic. This plate is secured to the sickle bar by means of a pair of angle brackets 50, of simple form, having one leg fitted to the plate 48 and the other to the frame bar 23 of the sickle bar. It is to be noted that the brackets 50 are spaced along the plate at a distance equal to the spacing between desired ones of the bolts 42 holding the brackets 41. In this case the guard or shield is of such length, and the brackets so spaced, that the brackets register with certain ones of the bolts, and these bolts are utilized for securing the brackets and thus the guard. Mounting the guard by means of the same bolts constitutes the only modification of the original device to apply the guard thereto.

The guard or shield 47 when so mounted, is in register with the second handle 44, extending longitudinally therebeyond in both directions. It will be further noted that the handle 44 is positioned adjacent the inner end of the sickle bar for convenience in holding the device by the user, this position being relatively close to the first handle, and the sickle bar extends outwardly longitudinally therebeyond a considerable distance. That extended end portion of the sickle bar then is most often in the range of the desired cutting or clipping action, that is, it extends a considerable distance from the user. The guard 14 of the present invention, being in register with the second handle 44, is correspondingly positioned adjacent the inner end of the sickle bar.

The plate 48 is mounted preferably at an oblique angle to the generally flat shape of the sickle bar, or relative to the horizontal. This angle may be for example at about 30° from the horizontal. Any such angle within a wide range may be utilized, such as shown in dot-dash lines in FIG. 5.

The guard 14 does not interfere with the clipping action, in cutting the hedge. The angular position of the plate 48 exposes the clippings being cut, as at 52 in FIG. 5. In the case where such clippings are relatively long, as at 54 in FIG. 6, the shield may still be positioned at the angle noted, because the twigs can bend without objectionably displacing them from the cutting point of view. Nevertheless, if it should be desired to expose long clippings more fully, the shield may be positioned in a more upright position, to expose a greater area where the clippings are being cut.

Since the shield 14 of the invention is positioned adjacent the inner end of the sickle bar, the outer end of the sickle bar is nevertheless exposed and unencumbered, which is significant in the cutting action at the outer end of the sickle bar.

I claim:

1. In a sickle that incorporates an engine at an inner end, and a sickle bar with inner and outer ends, under and upper sides, and rear and front edges, and including cutter elements at the front edge of the sickle bar, the sickle also incorporates a first handle at the inner end of the sickle and a second handle on the rear edge of the sickle bar intermediate the ends of the latter, the improvement comprising, guard means including a plate secured at an edge thereof to the sickle bar adjacent the rear edge of the latter, and extending upwardly and forwardly over the cutter elements to a position adjacent the level of the upper side of the second handle.

2. The sickle of claim 1 wherein, the plate is transparent.

3. The sickle of claim 1 wherein, the plate when so secured is positioned closely adjacent the inner end of the sickle bar, and whereby the outer end of the sickle bar beyond the guard is exposed and unencumbered from the guard.

4. The sickle of claim 1 wherein, the second handle of the sickle includes a hand grip and a shield extending upwardly beyond the hand grip, and wherein, the plate extends upwardly to adjacent the level of the upper edge of the shield of the second handle.

5. The sickle of claim 1 wherein, the sickle bar further includes a plurality of longitudinally extending, and mutually registering elements, and includes bolts for securing said elements, and wherein, the plate is secured to the sickle bar by means of certain ones of said bolts.

6. The sickle of claim 1 wherein, the guard means includes only said plate and a pair of brackets, and the brackets are operable for mounting the plate on the sickle bar.

* * * * *